United States Patent Office 3,394,205
Patented July 23, 1968

3,394,205
PROCESS FOR REACTING PHOSPHONI-
TRILE CHLORIDES WITH METHANOL
AND AMMONIA
Xavier Bilger, Soisy, Montmorency, France, assignor to Etablissements Kuhlmann, Paris, France
No Drawing. Filed May 8, 1964, Ser. No. 366,184
Claims priority, application France, May 10, 1963, 934,386
7 Claims. (Cl. 260—973)

ABSTRACT OF THE DISCLOSURE

A process for the preparation of water-soluble phosphorus compounds which comprises reacting, at a temperature between —10° C. and +50° C., methanol and gaseous ammonia with a polymeric phosphonitrile chloride of the formula $(PNCl_2)_n$, wherein $n$ is an integer from 3 to 4 inclusive which is in solution in an inert solvent. The water-soluble phosphorus compounds are useful for the flameproofing of cellulosic fibres.

---

The present invention concerns new compounds of phosphorus and nitrogen.

Processes for the preparation of phosphorus compounds and their application in the flameproofing of cellulosic fibres have been described in U.S. Patents 3,012,908 and 3,193,571. These processes consist essentially treating compounds of phosphorus and nitrogen of the general formula $P_nN_{n-1}Cl_{2n+3}$ wherein $n$ is greater than 1, or their commercial mixtures with phosphonitrile chlorides, with methanol and gaseous ammonia, under various conditions and in different orders.

It has now been found that it is possible to obtain phosphorus compounds analogous to those described in the documents cited above and possessing very good flameproofing power with regard to cellulosic fibres, by reacting, preferably in the presence of an inert solvent, methanol and gaseous ammonia with polymeric phosphonitrile chlorides: $(PNCl_2)_n$ where $n$ is greater than 1.

Polymeric phosphonitrile chlorides, $(PNCl_2)_n$, are known substances. Phosphonitrile chlorides with a specific degree of polymerisation, for example the trimer or tetramer, can be used as well as the crude mixtures of polymers such as are generally obtained by the action of ammonium chloride on phosphorus pentachloride. Although polymeric phosphonitrile chlorides are preferred in industrial use and for economic reasons, and the invention is described with reference to the chlorides, it is also possible to carry out the same reactions with the other polymeric phosphonitrile halides.

The choice of inert solvents which may be ued for the process is very large and comprises hydrocarbons, halogenated derivatives, nitro-derivatives, nitriles and ethers. Compounds are preferably selected in which the polymeric phosphonitrile chlorides are very soluble and which at the same time are easy to remove and to recover, for example benzene, toluene, chlorobenzene or chloroform.

The action of the methanol and ammonia can take place within fairly wide limits of temperature; in practice, one prefers to work between —10° C. and +50° C.

To the solution of polymeric phosphonitrile chlorides in the inert solvent the methanol can first be added and then the ammonia, or the methanol and ammonia may be added simultaneously, for example by adding a solution of ammonia in methanol. Another variant of the process consists in treating the solution of polymeric phosphonitrile chlorides first with a limited quantity of ammonia, then with the methanol and finally with the remainder of the ammonia.

The amounts of methanol used may vary greatly. They are between 0.4 and 4 molecules, for example between 0.5 and 1 molecule, of methanol per atom of chlorine contained in the polymeric phosphonitrile chlorides.

The quantity of ammonia introduced is that which is necessary to obtain a reaction product giving an aqueous solution having a pH between 4 and 8. The limited quantity of ammonia, which may in some cases be introduced before the action of the methanol, can also vary greatly, but in order to obtain phosphorus derivatives which are soluble in water, this quantity must not exceed 0.5 molecule per atom of chlorine contained in the polymeric phosphonitrile chlorides.

The end products are completely soluble in water and may be offered, for example, in concentrated aqueous solution.

The products obtained may be used for the flameproofing of cellulosic fibres by processes analogous to those described in the aforementioned documents.

The following examples in which the parts indicated are parts by weight, illustrate the invention without restricting it.

Example 1

232 parts of trimeric phosphonitrile chloride are dissolved in 600 parts of dry benzene. 17 parts of gaseous ammonia are added in a period of 30 minutes and then 112 parts of methanol are added in about 30 minutes. During these successive additions the temperature of the reaction mixture is kept below 25° C. After stirring for 15 hours, 75 parts of ammonia are added to the reaction mixture at a temperature between 20° C. and 25° C. The mixture is left to stand for 20 hours, then the precipitate formed is separated by filtration. The precipitate is suspended in 400 parts of methanol, and after stirring for 4 hours, the reaction mixture is filtered and the residue is washed with 200 parts of a mixture of methanol and chlorobenzene in the proportions of 2 to 1. The filtrate and washings are united and the solvents are distilled off. After dissolving the residue from the distillation in 53 parts of water, 230 parts of a viscous liquid containing 22.5% of phophorus and 20.3% of nitrogen are obtained. When applied to cotton fabric, this product gives good flameprofing effects which are resistant to repeated washing.

Example 2

A solution in 600 parts of chlorobenzene of 345 parts of crude polymeric phosphonitrile chloride, such as is obtained by the action of more than one molecule of ammonium chloride on one molecule of phosphorus pentachloride according to known precesses, is treated with 116 parts of methanol, then with 118 parts of gaseous ammonia. The temperature of the reaction mixture is maintained at between 20° C. and 30° C. during the reaction. After stirring for 20 hours, a sample is taken from the reaction mixture, stirred with 5 times its volume of water and heated on a water bath for 5 minutes, an aqueous solution with a pH of 5.4 being obtained. Afterwards, the process is as in Example 1, but 40 parts of water are added to the residue after distillation of the solvents. 160 parts of a viscous liquid containing 21.5% of phosphorus and 20.2% of nitrogen are obtained.

Example 3

(A) 93.5 parts of ammonium chloride, obtained as a by-product in Example 1 of U.S. Patent No. 3,012,908 are added to a mixture of 417 parts of phosphorus pentachloride and 440 parts of chlorobenzene, obtained by the action of chlorine on 275 parts of phosphorus trichloride in 440 parts of chlorobenzene according to known processes. The mixture is heated under reflux, that is at 126 to 127° C. The reaction is accompanied by the evolution of hydrochloric acid. After heating for about one and a half hours, the temperature falls spontaneously in 45 minutes to 121° C., and then rises again to 127 to 128° C. 220 parts of chlorobenzene are then distilled and heating under reflux is continued until the evolution of hydrochloric acid has finished. 439 parts of an orange liquid of density 1.38 are obtained, containing 31.5% of an orange liquid product insoluble in petrol ether and 26.6% of trimeric and tetrameric phosphonitrile chloride. The condensation product thus obtained is diluted with three times its volume of petroleum ether. The orange liquid forming the lower layer is separated and the upper layer, colourless and clear, is freed from petroleum ether and chlorobenzene. A greyish crystalline product is obtained which consists essentially of a mixture of trimeric and tetrameric phosphonitrile chlorides.

(B) 315 parts of the mixture of trimeric and tetrameric phosphonitrile chlorides obtained according to (A) are dissolved in 800 parts of chlorobenzene. The solution obtained is well stirred and treated with 23.5 parts of dry ammonia at a temperature of 25° C. to 30° C. Then 156 parts of methanol are run in at the same temperature and the mixture is stirred again for 15 hours. A further 98 parts of gaseous ammonia are added followed by further stirring for 20 hours. The reaction mixture thus obtained is filtered and then treated as in Example 1, while 40 parts of water are finally added to the residue from evaporation of the solvents.

The final product obtained (260 parts) is in the form of a viscous liquid of density 1.39 which is completely soluble in water. The contents of phosphorus and nitrogen are 24.9% and 23.3% respectively. An aqueous solution of this product, containing urea, when applied to cotton fabric so as to deposit thereon about 20% of the final product, then dried and heat treated at 150° C., gives very good flameproofing effects which are resistant to repeated washing.

Example 4

415 parts of the mixture of the polymeric phosphonitrile chlorides obtained in Example 3A are dissolved in 900 parts of chlorobenzene. The solution thus prepared is stirred and cooled to 15° C. 200 parts of methanol are added in 1½ hours and the mixture is stirred overnight. Then 165 parts of gaseous ammonia are added in a closed vessel and the mixture is again stirred for 20 hours. The white precipitate formed is separated by filtration and treated as indicated in Example 1. The residue after evaporation of the solvents is treated with 53 parts of water. 340 parts of a viscous liquid containing 25.6% of phosphorus and 23.8% of nitrogen are finally obtained. The flame-proofing effects obtained on cotton fabric are comparable with those obtained with the product of Example 3.

Example 5

The final product analogous to that of the preceding example is obtained by treating, while stirring, the same solution of 415 parts of the mixture of polymeric phosphonitrile chlorides in 900 parts of chlorobenzene with 240 parts of a solution of ammonia in methanol, containing 16.5% of ammonia. During the introduction of the methanolic solution of ammonia, the mass is cooled with an ice bath and the flow of liquid is regulated so that a temperature of 20° C., is not exceeded. After stirring for about 15 hours a further quantity of ammonia in gaseous form, about 130 parts, is added and the operation is continued as in Example 4.

I claim:
1. Process for the preparation of water-soluble phosphorus compounds which comprises reacting, at a temperature between −10° C. and +50° C., methanol and gaseous ammonia with a polymeric phosphonitrile chloride of the formula $(PNCl_2)_n$, wherein $n$ is an integer from 3 to 4, inclusive, in the presence of an inert solvent in such a quantity that the chloride is in the dissolved state, the amount of methanol being from 0.4 to 4 molecules per atom of chlorine in the polymeric phosphonitrile chloride and the amount of ammonia being that necessary to obtain a reaction product giving an aqueous solution having a pH between 4 and 8.

2. Process as claimed in claim 1 in which the phosphonitrile chloride is a mixture of trimer and tetramer.

3. Process according to claim 1 wherein the solvent is a member selected from the group consisting of benzene, toluene, chlorobenzene and chloroform.

4. Process according to claim 1 wherein the methanol is added to the polymeric phosphonitrile chloride followed by the ammonia.

5. Process according to claim 1 wherein the polymeric phosphonitrile chloride is reacted with a limited quantity of ammonia, the amount not exceeding 0.5 molecule per atom of chlorine in the chloride, then with the methanol and finally with the remainder of the ammonia.

6. Process according to claim 1 wherein the methanol and ammonia are added simultaneously to the polymeric phosphonitrile chloride.

7. Process according to claim 6 wherein the amount of methanol is the minimal proportion of 0.4 molecule per atom of chlorine in the chloride.

References Cited
UNITED STATES PATENTS 3,012,908  12/1961  Bilger _____ 260—973 XR
3,193,571  7/1965   Bilger _____ 260—927

CHARLES B. PARKER, *Primary Examiner.*

A. H. SUTTO, *Assistant Examiner.*